United States Patent [19]
Peitsmeier

[11] 3,902,341
[45] Sept. 2, 1975

[54] STEERING LOCK FOR VEHICLES

[75] Inventor: Karl Peitsmeier, Neuhausen, Germany

[73] Assignee: Daimler-Benz Aktiengesellschaft, Stuttgart, Germany

[22] Filed: Jan. 31, 1974

[21] Appl. No.: 438,291

[30] Foreign Application Priority Data
Feb. 1, 1973 Germany............................ 2304860

[52] U.S. Cl................................. 70/252; 200/61.54
[51] Int. Cl.² ........................................ B60R 25/02
[58] Field of Search ....................................... 70/252

[56] References Cited
UNITED STATES PATENTS
2,101,446  12/1937  Neiman................................. 70/186
3,569,930  3/1971  Hirama ............................. 340/63

Primary Examiner—Albert G. Craig, Jr.
Attorney, Agent, or Firm—Craig & Antonelli

[57] ABSTRACT

A steering lock for vehicles, especially for motor vehicles, with a locking mechanism mechanically locking the steering as a function of the position of the ignition key and with a switch disconnecting at least a part of the power supply; a further shifting member is thereby provided in the lock housing which carries out a positively controlled stroke movement during the rotation of the ignition key; the shifting member transmits its stroke movement to a plunger of a switch which plunger is located substantially in the axis of the lock cylinder.

2 Claims, 3 Drawing Figures

3,902,341

STEERING LOCK FOR VEHICLES

The present invention relates to a steering lock for vehicles, especially motor vehicles, with a locking mechanism mechanically locking the steering in dependence on the position of the ignition key and with at least one switch disconnecting parts of the power supply or electrical wiring system.

For the most varied reasons to an ever-increasing extent, still further contact arrangements actuated by the ignition key are needed in addition to the ignition switch in order to control, for example, locking mechanisms or electric or acoustic warning devices.

Contact arrangements are already known in the prior art which form a part separate from the steering lock and which follow or contact, for example, the ignition key tip or parts of the lock cylinder by way of an actuating pin disposed perpendicular to the axis of rotation of the lock cylinder.

It has also been already proposed to accommodate the contact device in the lock cylinder itself whereby two mutually opposite contacts are provided which during insertion of the ignition key into the steering lock are electrically connected with each other by the shank of the ignition key.

These prior art installations, however, entail the disadvantage that the additional contact arrangement is so operatively connected with the lock cylinder or the mechanical locking mechanism that, for example, in case of a defective lock cylinder, also the additional contact arrangement has to be interchanged. This, however, makes considerably more difficult the exchange operation since also electrical connections have to be established anew.

It is the aim of the present invention to provide in a steering lock with a mechanical part and with an electrical part spatially separated therefrom, a possibility to arrange at least one additional contact device independent from the mechanical part of the steering lock. Particular value is thereby placed on the fact that the lock construction remains far-reachingly unchanged, i.e., as many parts as possible of the prior art constructions can be re-used, and the handling and manipulation of the lock can be preserved.

Consequently, a steering lock for vehicles, especially for motor vehicles, with a locking mechanism mechanically locking the steering in dependence on the position of the ignition key and with a switch disconnecting at least a part of the power supply is proposed whereby according to the present invention a further shifting or switching member carrying out a positively controlled stroke movement during the rotation of the ignition key is provided in the lock housing which transmits its stroke movement to a plunger located in the axis of rotation of the lock cylinder of a make and break switch, e.g., of a normally open contact.

In one preferred embodiment of the present invention, a control cam is mounted as shifting member on the side of a slide member initiating the mechanical locking mechanism, which faces the plunger, whereby the plunger abuts springily or elastically at the control cam.

In a further embodiment of the present invention, a slide member initiating the mechanical locking mechanism includes as shifting member a locking cam with an abutment surface and displaceable by the ignition key in the axial direction of the lock cylinder against the pressure of a spring during the rotation of the ignition key, which abutment surface transfers the plunger onto a lug projecting from the slide member with an inserted ignition key during the movement of the slide member.

Accordingly, it is an object of the present invention to provide a steering lock for vehicles, especially for motor vehicles, which avoids by simple means the aforementioned shortcomings and drawbacks encountered in the prior art.

Another object of the present invention resides in a steering lock for motor vehicles which permits the possibility of an additional electrical contact separate from the mechanical steering lock mechanism as such.

A further object of the present invention resides in a steering lock in which the additional contact device does not have to be exchanged together with the locking mechanism in case of a defective lock cylinder.

Still a further object of the present invention resides in a steering lock with an additional electrical contact which considerably facilitates repair of the ignition switch.

These and other objects, features and advantages of the present invention will become more apparent from the following description when taken in connection with the accompanying drawing which shows, for purposes of illustration only, two embodiments in accordance with the present invention, and wherein.

Figure 1:
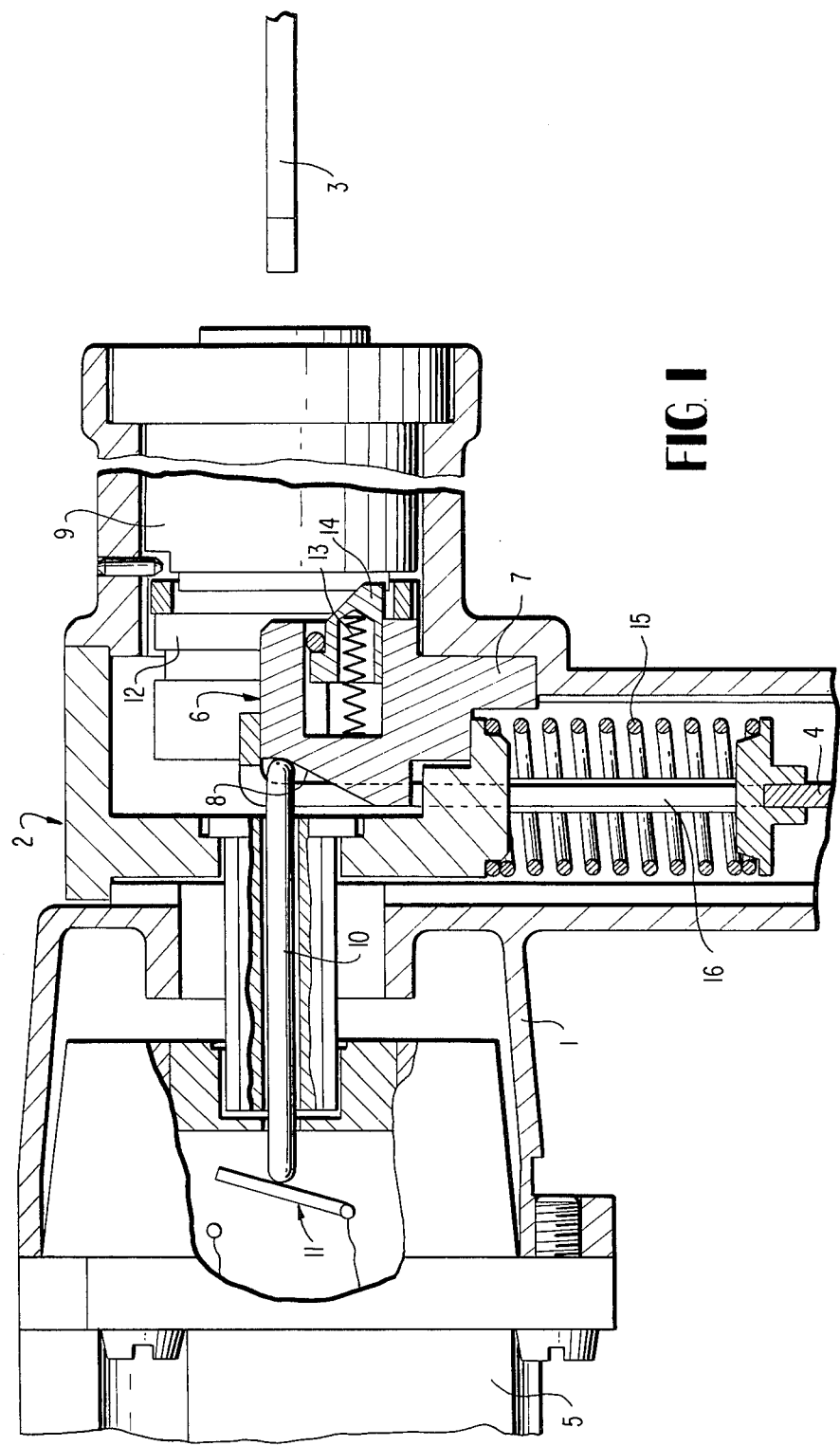
FIG. 1 is a partial cross-sectional view of a first embodiment of a steering lock in accordance with the present invention with the ignition key pulled out of the lock.
Figure 2:
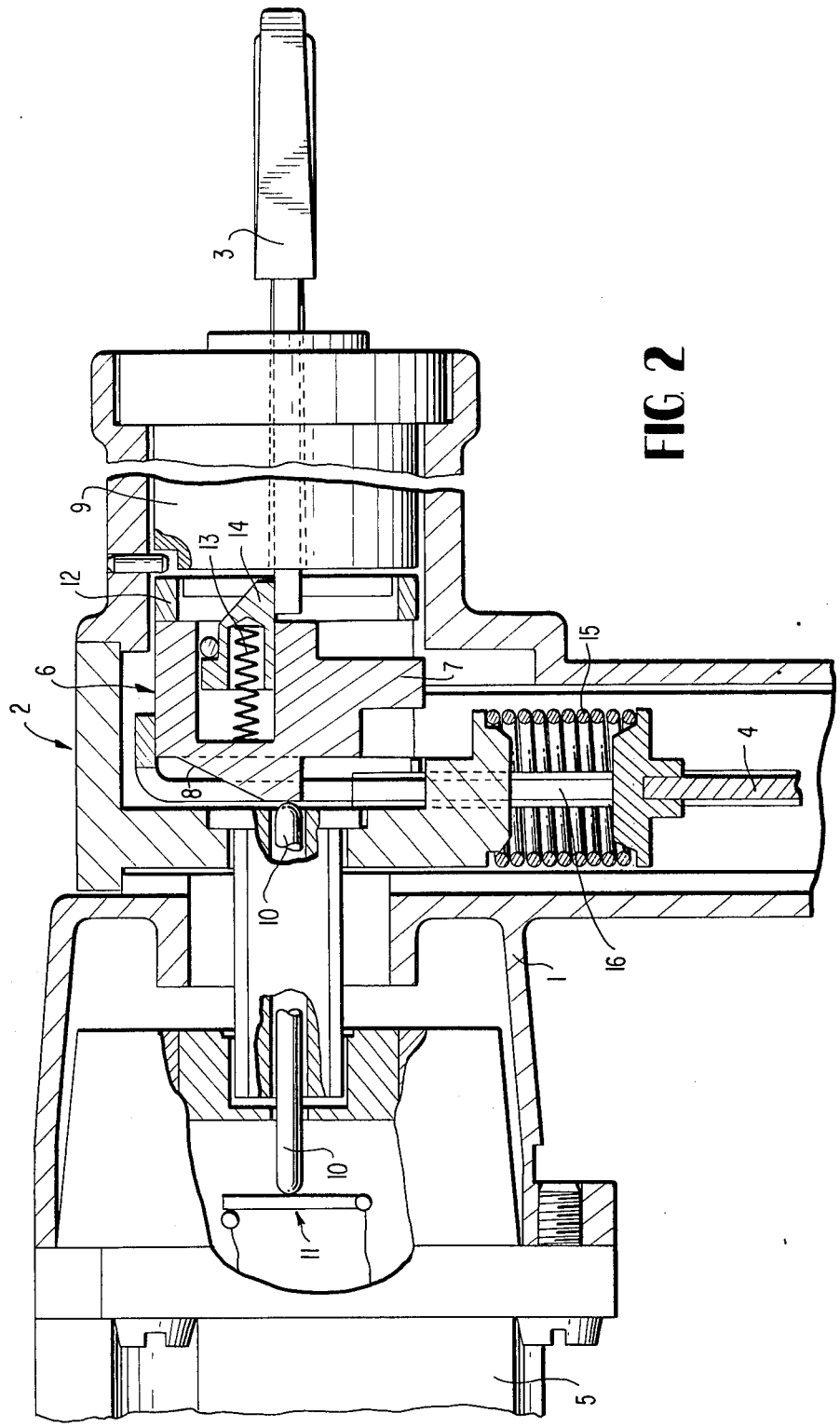
FIG. 2 is a partial cross-sectional view of the embodiment of the steering lock according to FIG. 1, with inserted ignition key after rotation out of the drive position.

Referring now to the drawing wherein like reference numerals are used throughout the various views to designate like parts, and more particularly to FIGS. 1 and 2, the lock housing 1 of a steering lock generally designated by reference numeral 2 accommodates a conventional locking mechanism 4 mechanically locking the steering (not shown) of a motor vehicle in dependence on the position of the ignition key and a conventional switch 5 disconnecting a part of the power supply or electrical wiring system. Furthermore, a shifting member generally designated by reference numeral 6 is arranged in the lock housing 1 which is constructed as slide member 7, carries a control cam 8 and receives during the rotation of the ignition key 3 a positively controlled stroke movement which is transmitted from the control cam 8 to a plunger 10 located in the axis of rotation of the lock cylinder 9 of a normally open electrical switch 11. The slide member 7 thereby cooperates in a conventional manner, not illustrated in detail herein, with a shifting shaft 12 and accommodates a locking cam 14 displaceable against the force of a spring 13.

In FIG. 1 the ignition key 3 is pulled out of the lock cylinder 9, and the locking mechanism 4 which is of conventional construction and therefore not illustrated in detail herein, leads in a conventional manner to a locking of the steering spindle since a shifting rod 16 abutting by the interaction of a spring 15 against the top side of the shifting member 6 has carried out a corresponding downward stroke movement. The plunger 10 engages the lowermost area of the control cam 8 and the switch 11 is opened.

If the ignition key 3 is inserted into the lock cylinder 9 and is rotated through 90° up to the drive position, then the shifting shaft 12 rotates in unison therewith and the slide member 7 travels upwardly, as viewed in the drawing, whereby simultaneously the locking mechanism 4 is taken along and the spring 15 is stressed. The plunger 10 slides along the control cam 8 and is displaced so long in the direction of the switch 11 until the latter closes.

If the ignition is again disconnected by rotating back the ignition key 3 into the initial position—which is illustrated in FIG. 2—then the switch 11 continues to remain closed if the ignition key 3 is not pulled out. In this switch position, a signal transmission or indication takes place in a conventional manner (not shown) which calls attention to the fact that the ignition key 3 still remains in the lock cylinder 9. Only when the ignition key 3 is pulled out, the displaceable locking cam 14 no longer is supported at the key shank and the slide member 7 is transferred by the force of the spring 15 into the position illustrated in FIG. 1. Simultaneously therewith also the signal transmission is interrupted.

Figure 3:
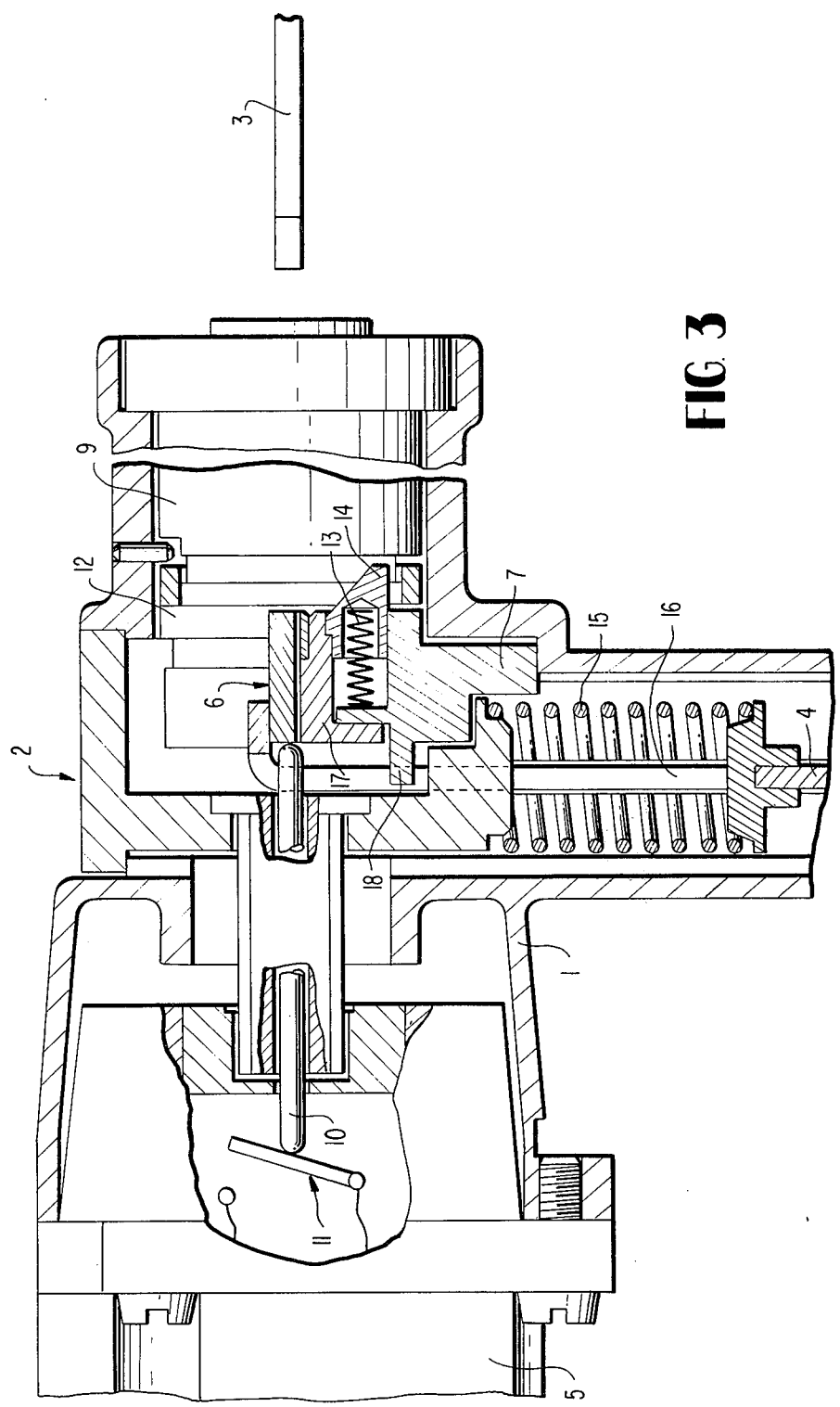
FIG. 3 is a partial cross-sectional view of a modified embodiment of a steering lock in accordance with the present invention with a pulled-out ignition key.

An embodiment similar to FIGS. 1 and 2 is illustrated in FIG. 3. For purposes of a more simplified understanding, parts of the same type and having the same function are designated in both embodiments by the same reference numerals. In contrast to the steering lock according to FIGS. 1 and 2, the locking cam 14 is fixedly provided with an abutment surface 17 in FIG. 3. If now the ignition key 3 is inserted into the lock cylinder 9 and is rotated, then the slide member 7 travels upwardly and the locking cam 14 is forced in by the ignition key 3 against the force of the spring 13. The plunger 10 which has traveled in the meantime onto the abutment surface 17, thus receives a stroke moment and is transferred at the end of the key rotation onto a lug 18 projecting from the slide member 7. The switch 11 is now again closed. This closing position remains—as described in connection with the embodiment of FIG. 2—in the same manner until the ignition key 3 is pulled out.

Since many of the parts of the ignition lock of this invention such as the lock mechanism 9, the switch 5 and the mechanical steering lock including parts 4, 15 and 16 are of conventional construction, operating in a known manner and forming no part of the present invention, a detailed description thereof is dispensed with herein for the sake of brevity and clarity.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A steering lock for vehicles which includes a lock housing means, a lock cylinder means, a locking means mechanically locking the steering in dependence on the position of an ignition key, and a switch means disconnecting at least a part of the power supply, characterized in that a shifting means is provided in the lock housing means which is operable to carry out a positively controlled stroke movement during rotation of the ignition key, such shifting means transmitting its stroke movement to a plunger disposed substantially in the axis of rotation of the lock cylinder means of a further switch means, and in that a slide means initiating the mechanical locking means includes a shifting means a locking cam with an abutment surface, said locking cam being operable to be displaced in the axial direction of the lock cylinder means against the force of a spring means by the ignition key during rotation of the latter, said abutment surface transferring the plunger with an inserted ignition key during the movement of the slide means onto a lug projecting from the slide means.

2. A steering lock according to claim 1, characterized in that the further switch means is a normally open switch which is closed by the plunger upon carrying out its stroke movement.

* * * * *